United States Patent [19]

Kozlak

[11] Patent Number: 4,644,800

[45] Date of Patent: Feb. 24, 1987

[54] ANNULAR VENTURI FLOW MEASURING DEVICE

[75] Inventor: Martin J. Kozlak, Tariffville, Conn.

[73] Assignee: Combustion Engineering, Inc., Windsor, Conn.

[21] Appl. No.: 869,510

[22] Filed: Jun. 2, 1986

[51] Int. Cl.⁴ .............................................. G01F 1/44
[52] U.S. Cl. ................................................. 73/861.64
[58] Field of Search ........... 73/861.32, 861.61, 861.63, 73/861.64; 138/42

[56] References Cited

U.S. PATENT DOCUMENTS

| | | | |
|---|---|---|---|
| 1,126,275 | 1/1915 | Rice | 73/861.64 |
| 1,143,631 | 6/1915 | Keller et al. | 73/861.63 |
| 2,197,214 | 4/1940 | Hollander | 73/861.64 |
| 2,220,119 | 4/1941 | Montgomery et al. | 73/861.63 |

FOREIGN PATENT DOCUMENTS 405084  10/1924  Fed. Rep. of Germany ... 73/861.63

Primary Examiner—Herbert Goldstein
Attorney, Agent, or Firm—Arthur E. Fournier, Jr.

[57] ABSTRACT

A reduced length venturi type flow measuring device having a peripheral flow restricting surface 22, 30, 20 and a central hub 40 with flow restricting surfaces 42, 48, 52. Anti-spin vanes 60 support the hub. Pressure taps 60, 62 permit flow measurement, and temperature may be measured, 72, between adjacent vanes.

9 Claims, 2 Drawing Figures

ANNULAR VENTURI FLOW MEASURING DEVICE

BACKGROUND OF THE INVENTION

The invention relates to flow measurement and in particular to a venturi type device for sensing flow by measuring a differential in static pressures.

The total pressure of a flowing fluid is comprised of a velocity pressure component and a static pressure component. When the velocity is increased there is a reduction in the static pressure. The well known theory of a venturi flow meter takes advantage of this principle. The flow area within the duct is reduced, resulting in an increased velocity, and the area thereafter expanded back to the original size. Static pressures are measured upstream of the meter and at the throat or reduced section of the meter. The differential static pressure can be used to calculate the flow rate, provided the density of the fluid flowing is known.

The reduction in flow area followed by the expansion results in some non-recoverable pressure loss, with this loss being a function of the angle of convergence, the angle of divergence and the amount of the restriction. If there is very little area reduction, it is difficult to get sufficient pressure differential to appropriately sense the flow. If on the other hand the area reduction is excessive, non-recoverable pressure losses will be high since they are a function of the high velocities occurring. A flow area in the throat which is 25% of the flow area in the duct is normal although this may range from 9% to 64%. This area reduction is often represented as a beta factor with beta being defined as the square root of the area of the throat divided by the area of the duct. The corresponding beta factors vary from 0.3 to 0.8. For a conventional venturi having a beta factor of 0.5, a convergence angle of 20 degrees (10° from the axis on each side) and a divergent angle of 15 degrees (7½° degrees from the axis on each side) the non-recoverable pressure loss is approximately 15 to 18% of the measured pressure differential. The venturi requires a length of about 4.0 duct diameters in addition to a minimum upstream straight length of 2 duct diameters.

If the flow approaching a venturi is swirling this swirling flow is increased as the diameter is restricted. This increased velocity further reduces the static pressure beyond what would normally be expected, thereby introducing error into the measurements.

The conventional venturi effects the area reduction by reducing the outer bounding surface or periphery.

U.S. Pat. No. 1,143,631 shows a differential pressure fluid measuring device wherein an insert is placed within a straight pipe to reduce the flow area obtaining the high velocity in an annular throat.

Proper operation of a venturi requires a uniform temperature and flow condition at the approach. It accordingly requires considerable length of straight duct upstream of the venturi to give the flow conditions time to become uniform after the last flow perturbation. In some cases insufficient length is available because of physical limitations. Inlet ducts carrying air flow to a cold pulverizer are often located in cramped quarters and include within the duct system introductions of hot and cold air into a mixed stream. This results in temperature unbalance across the duct and the cramped quarters restrict the ability to find a sufficient length of straight duct into which to install a conventional venturi.

It is accordingly desirable to have a venturi type device of shorter length than the standard venturi and one which is more tolerant of unbalanced flow or temperature conditions.

SUMMARY OF THE INVENTION

An annular venturi has the periphery of the conduit converging to a throat location, followed by a discreet length of throat and thereafter diverging to the original duct size. Co-extensive with this is an inner member which diverges to the throat section, and converges after the throat section. This central member or hub is supported with a plurality of fixed vanes passing through the upstream section and the throat. Static pressure taps are located in the upstream duct and also in each section of the throat between the vanes. Thermocouples may also be supplied in each quadrant to determine the local temperature. Based on pressure differential between the upstream tap and the throat, flow may be determined either by averaging the readings or by considering each one individually.

The vanes operate to block any swirl in the pipe thereby eliminating error caused by swirling action of the fluid. The simultaneous reduction in flow area by the internal hub as well as the external conduit results in a shorter overall length for the same area reduction. For the same angles of convergence and divergence the non-recoverable pressure losses are less than in a conventional venturi, presumably because of the smaller requirement for radial movement of the gases during the contraction and expansion portions.

DESCRIPTION OF THE PREFERRED EMBODIMENT

Figure 1:
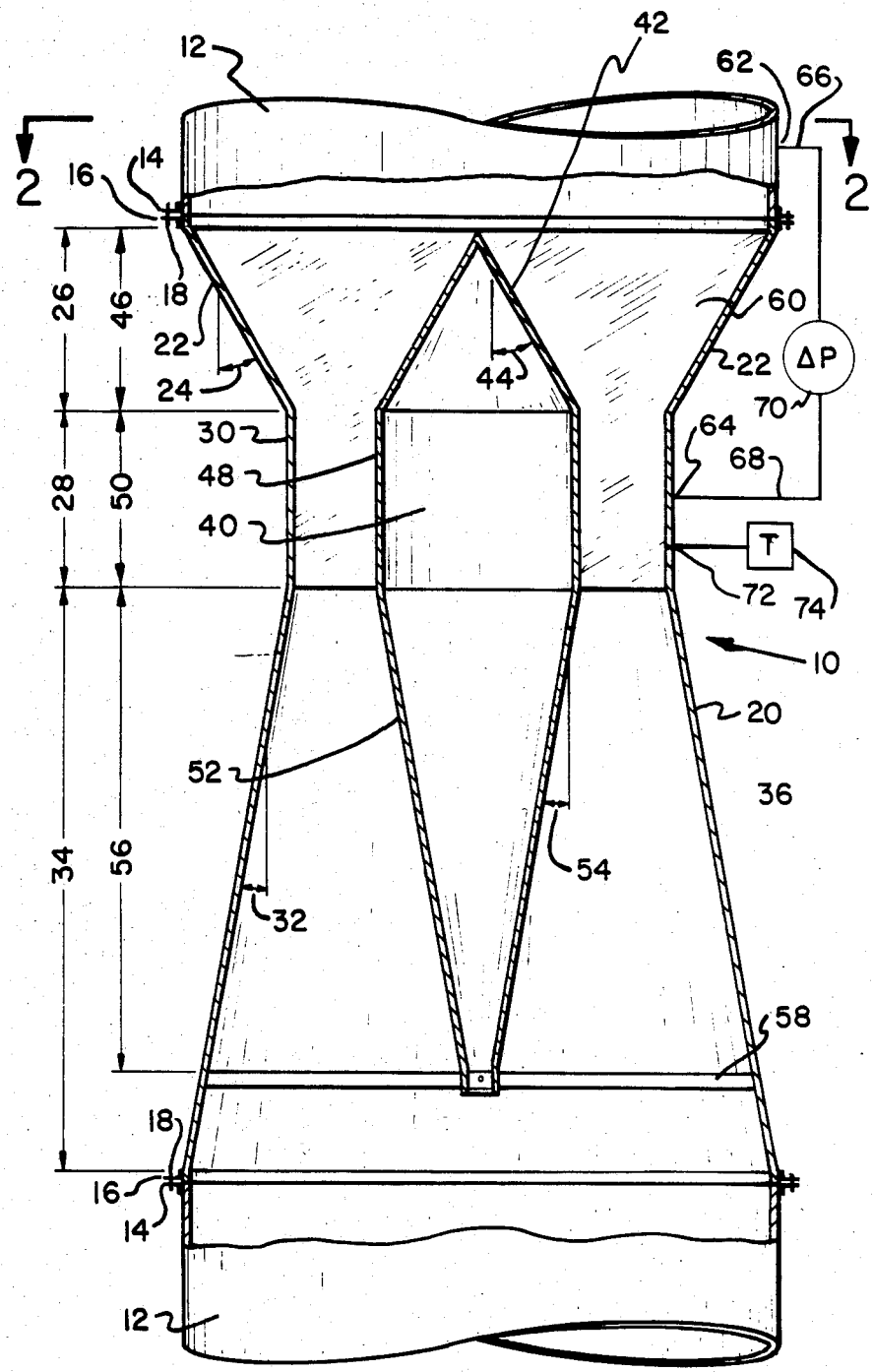
FIG. 1 is a sectional side elevation through the annular venturi.
Figure 2:
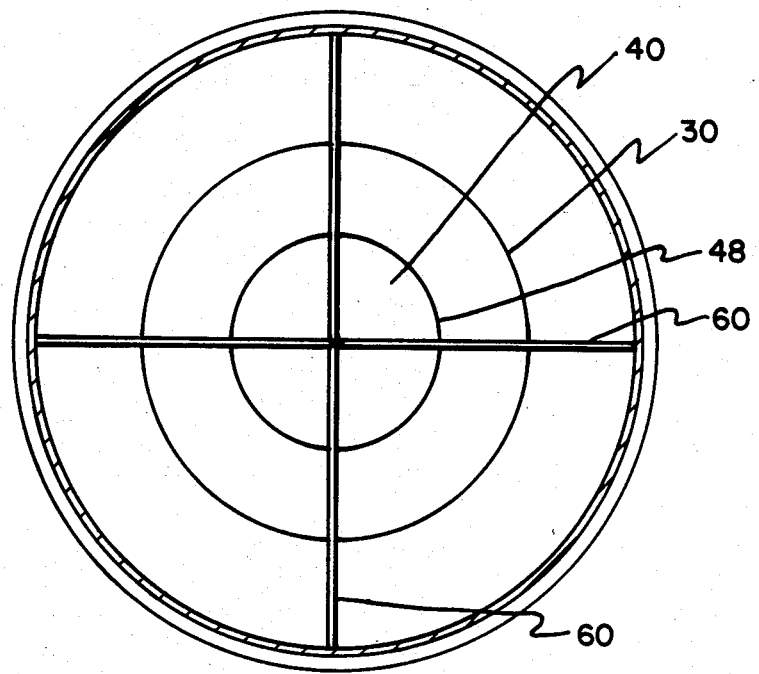
FIG. 2 is a sectional plan view taken on Section 2—2 of FIG. 1.

The annular flow measuring device 10 is located within duct 12 for the purpose of measuring flow therethrough. Angle irons 14 and 16 on the duct and flow device respectively are secured together by bolts 18 to support the flow device.

At the upstream end the flow area of the flow measuring device 10 is substantially equal to the flow area of duct 12. The outer portion of the flow device is comprised of a conduit 20 with a converging portion 22 at an angle 24 with respect to the longitudinal axis for a first length 26. Thereafter the walls of the conduit 20 extend substantially parallel to the longitudinal axis through length 28 as indicated by portion 30.

Following this the walls of the conduit diverge at a second angle 32 with respect to the longitudinal axis through a length 34 forming portion 36. This divergence continues until the area is substantially equal to the flow area at the upstream end.

An internally centrally located hub 24 is located substantially co-extensive with the walls of the conduit. The upstream portion 42 of the hub diverges at an angle 44 for a third length 46. A central portion of the hub 48 extends substantially parallel to the longitudinal axis for a throat length 50. Thereafter the downstream portion 52 of the hub extends at a fourth angle 54 through a fourth length 56 to the end of the hub. The hub is also supported at its downstream end by four struts 58, in the form of pipes.

Four anti-spin vanes 60 for supporting the hub 40 are located at the upstream end. Each is a flat plate extending between the walls 22 of the conduit and the upstream portion 42 of the hub. These vanes also extend through the throat, extending from wall 30 of the conduit to wall 48 of the hub. These vanes support and stabilize the hub, and also stop any spin which may be in the fluid approaching the annular venturi.

A static pressure tap 62 is located in the duct upstream of the annular venturi. Another static pressure tap 64 is located in the throat, one being located in each quadrant established by the vanes. These static pressure taps are connected by lines 66 and 68 respectively to a pressure difference sensing device 70 which detects the differential and static pressure from which flow may be calculated. The measurement may be made separately in each quadrant, or the throat static tapes may be ganged together for an average reading. There is also located in each quadrant a therma couple 72 connected to a temperature sensing device 74 which permits independent determination of the temperature in each quadrant. This is particularly of value in those situations where hot and cold gas may be mixed immediately upstream of the annular venturi, and there may not be time for sufficient mixing.

The first angle 24 is preferably 30° within the range of 25° to 35°, although angles from 20° to 45° are acceptable. Where the throat is formed by a straight length 30 as shown here, the length 28 of the throat should be approximately equal to the radius of surface 30 minus the radius of surface 48.

The second or diverging angle 32 at 12° should be preferably within the range of 10° to 15°, and acceptably within the range of 5° to 20°.

The third angle 44 is preferably 30° within the range of 25° to 35°, although angles from 20° to 45° are acceptable. The throat is formed by a straight length 48 as shown here, which is also the length 28.

The fourth or converging angle 54 at 12° should be preferably within the range of 10° to 15° and acceptably within the range of 5° to 20°.

The parameters affecting the non-recoverable pressure losses in the conventional venturi include the angle of convergence, similar to the first angle 24 and the angle of divergence, similar to second angle 32. For a beta of 0.55, a 10° angle of convergence (20° included angle), and a 7.5° divergence angle (15° included angle) the non-recoverable pressure loss in a standard venturi is approximately 15% of the measured pressure drop. Increasing these angles has a significant effect on the overall pressure drop.

With the annular venturi, also with the beta of 0.55, a 30° angle of convergence (60° included angle) and 7.5° angle of divergence (15° included angle) the non-recoverable pressure drop is approximately 15% of the measured pressure difference.

The short length of the annular venturi, in the order of 1.5 duct diameters, is effected by the simultaneous changing of the outer periphery as well as the change in flow area because of the hub. Tests have indicated that the penalty paid for increasing the angle of convergence as well as the angle of divergence is less severe on this annular venturi than on a conventional venturi. It is speculated that this is because of the reduced radial movement which is required of the gases through the convergent and divergent portions of the venturi.

The preferred embodiment has been described with a single angle of convergence and a single angle of divergence, since this is satisfactory and the simplest to fabricate. Each of these angles may be stepped, and radiuses may be included in the throat area as desired, without parting from the concept of the invention.

I claim:

1. A reduced length differential pressure venturi type flow measuring device for installation within a flow duct comprising:
    a peripheral flow confining conduit having a longitudinal axis, and having an upstream end of a flow area substantially equal to the flow area of the duct;
    the walls of said conduit converging inwardly from the upstream end at a first angle with respect to said axis for a first length;
    the walls of said conduit thereafter extending substantially parallel to said axis for a throat length;
    the walls of said conduit thereafter diverging at a second angle with respect to said axis for a second length to substantially the size of the upstream end;
    and internally centrally located hub substantially co-extensive with said walls;
    the upstream portion of said hub diverging at a third angle with respect to said axis for a third length;
    the central portion of said hub extending substantially parallel to said axis for throat length, the annular space between the substantially parallel walls of said conduit and the substantially parallel portion of said hub comprising a throat;
    the downstream portion of said hub converging at a fourth angle with respect to said axis for a fourth length to the downstream end of said hub;
    means for supporting said hub within said conduit;
    means for sensing the static pressure within said duct; and
    means for sensing the static pressure within said throat.

2. A flow measuring device as in claim 1:
    said means for supporting said hub comprising a plurality of vanes; each vane comprised of a flat plate extending between the walls of said first length and said hub for said third length.

3. A flow measuring device as in claim 2:
    each of said flat plates also extending between said walls and said hub through the length of said throat.

4. A flow measuring device as in claim 3:
    said means for sensing static pressure within said throat comprising means for sensing static pressure between each pair of adjacent vanes.

5. A flow measuring device as in claim 4:
    a thermocouple located between said hub and said wall between each pair of adjacent vanes.

6. A flow measuring device as in claim 1:
    said first angle and said third angle each being between 10° and 45°.

7. A flow measuring device as in claim 1:
    said second angle and said fourth angle each being between 5° and 20°.

8. A flow measuring device as in claim 1:
    said first angle and said third angle each being between 25° and 35°.

9. A flow measuring device as in claim 1:
    said second angle and said fourth angle each being between 10° and 15°.

* * * * *